United States Patent [19]

Miyama et al.

[11] Patent Number: 4,945,123

[45] Date of Patent: Jul. 31, 1990

[54] COATING COMPOSITION FOR TREATING SURFACE OF HIGH MOLECULAR ELASTIC MATERIAL

[75] Inventors: Masayoshi Miyama; Hiroki Komori, both of Chiba, Japan

[73] Assignee: Kinugawa Rubber Industrial Co., Ltd., Chiba, Japan

[21] Appl. No.: 304,816

[22] Filed: Jan. 31, 1989

[30] Foreign Application Priority Data

Feb. 2, 1988 [JP] Japan .................................. 63-22483

[51] Int. Cl.$^5$ ............................................. G08J 7/02
[52] U.S. Cl. ..................................... 524/269; 524/507
[58] Field of Search ............................... 524/269, 507

[56] References Cited

FOREIGN PATENT DOCUMENTS 61-138639  6/1986  Japan .

*Primary Examiner*—Joseph L. Schofer
*Assistant Examiner*—John J. Guarriello
*Attorney, Agent, or Firm*—Bachman & LaPointe

[57] ABSTRACT

A coating composition for treating a surface of a high molecular elastic material is disclosed which consists essentially of (a) a urethane coating material; (b) a silicone oil; (c) a fluorocarbon resin powder; and (d) a polyethylene powder, the silicone oil, fluorocarbon resin powder, and polyethylene powder being mixed and blended with the urethane coating material. The coating composition provides a superior wear resistance characteristic and wear durability and a low friction coefficient for the coated surface.

4 Claims, No Drawings

COATING COMPOSITION FOR TREATING SURFACE OF HIGH MOLECULAR ELASTIC MATERIAL

BACKGROUND OF THE INVENTION (1) Field of the invention

The present invention relates to a coating composition for treating a surface of a high molecular elastic material which is tightly fixed to a surface of a coated material of the high molecular elastic material such as a non-polar rubber under one coating treatment and which exhibits a repellency (water tightness and air tightness), lubricating ability, wear resistance, durability, sound proof characteristic, non-adhesive and non-freeze characteristic, etc., on the treated surface.

(2) Background of the art

Characteristics required for a surface coated material composed of a high molecular elastic substance, e.g., applied to a weatherstrip member or applied to a glass run channel member used in an automotive vehicle and/or sashes in a building have been demanded so as to include a weathering resistance (weatherability), heat resistance, non-freeze characteristic, water-proof characteristic, wear resistance (abrasion resistance) characteristic, lubricating ability, and so on.

For example, such a weatherstrip member as used in the automotive vehicle is disposed on a sliding surface between a window glass pane and vehicle door and/or contacting surface between the vehicle door and a coated plate of a vehicle body and is made of a strip of rubber and/or vinyl chloride.

In order to provide a lubricating ability and a repellency for the surface of the weatherstrip member used in the automotive vehicle, a coating material of a urethane to which a coating composition in which a hardened silicone, adhesive, and silicone oil are blended is applied and an adhesiveness of the urethane coating material provides a toughness for a film of the formed coating film as disclosed in a Japanese Patent Application First Publication (Un-examined) sho 61-138639 published on June 26, 1986.

However, although such a composition as coating material of the urethane-silicone oil provides the repellency (water tightness and air tightness) on the surface of the coated film, both a friction coefficient test and friction durability test have indicated that the silicone oil bleeded out while both tests were conducted and that the friction coefficient was great and both abrasion resistance characteristic and abrasion durability were inferior.

SUMMARY OF THE INVENTION

It is an object to provide a coating composition for treating a high molecular elastic material which is superior in its wear resistance characteristic and durability but has a low friction coefficient.

The above-described object can be achieved by providing a coating composition for treating a surface of a high molecular elastic material, comprising: (a) a urethane coating material; (b) a silicone oil; (c) a fluorocarbon resin powder; and (d) a polyethylene powder, the silicone oil, fluorocarbon resin powder, and polyethylene powder being mixed and blended with the urethane coating material.

The above-described object can also be achieved by providing a coating composition for treating a surface of a weatherstrip member applicable to an automotive vehicle, comprising: (a) a urethane coating material; (b) a silicone oil; (c) a fluorocarbon resin powder; and (d) a polyethylene powder, the silicone oil, fluorocarbon resin powder, and polyethylene powder being mixed and blended with the urethane coating material.

DETAILED DESCRIPTION OF THE PREFERRED EMBODIMENTS

Compositions of a coating material for treating a surface of a high molecular elastic material in a preferred embodiment according to the present invention included as follows:

(1) Urethane coating material (solid)—100 parts of weight,
(2) Silicone oil—60 parts of weight,
(3) Fluorocarbon resin powder—50 parts of weight (grain size; 10 to 20 $\mu$m) and
(4) Polyethylene powder—10 parts of weight (grain size; 20 to 30 $\mu$m). (2) to (4) were mixed and blended into (1).

Table 1 shows data of respective tests of (1) friction coefficient test, (2) friction durability test, (3) water tightness test, and (4) air tightness test when the coating composition for treating the surface of the poly molecular elastic material in the preferred embodiment was applied to a specimen and when the coating composition for treating the surface of the high molecular elastic material disclosed in the Japanese Patent Application First Publication Sho 61-138639 (conventional) was applied to the same specimen under the same tests.

It is noted that the friction coefficient test was conducted by measuring the friction coefficent when each weight of 270 g, 400 g, and 650 g was sequentially loaded on two specimens each having 100 mm width and they were sequentially pulled together each at a speed of 200 mm/minutes.

The friction durability test was conducted by measuring the friction durability a number of times using an abrasive tester (based on a method of the Japan Society for Promotion of Scientific Research) in which a weight of 200 g was applied onto the specimen of 10 mm width through an abrasive paper (sand paper; 800 CW), the specimen was then polished at a stroke of 120 mm, and the abrasive paper was renewed whenever the polishments were carried out 300 times.

The water tightness test was conducted by measuring a time (second) taken for a water to be immersed into the vehicle compartment through a clearance between the weatherstrip member and window glass pane when the water is discharged from a hose in the horizontal direction and the water discharge is started with 30 to 40 cm of discharge distance under a water pressure such that the horizontal discharge distance is 1 m with 1 m of a height of the hose.

Furthermore, the air tightness test was conducted by measuring a time (second) taken for a water level to be described below to become zero from a time when the weatherstrip member for the automotive vehicle as the specimen was sealed and arranged onto an upper portion of an air-tight bath, whose lower vertical portion was linked with a letter U-shaped tube into which the water was filled so that the water level is changed in the tube folded portion, the air being filled into the air-tight bath and the flow of air out of the clearance between the specimen and window glass pane being derived from the water level of the U shaped tube to a time when the water level became zero (a water level difference between one of the U-shaped folded portion and the other became zero).

It is also noted that a structure of a weatherstrip member (or glass run channel member) is exemplified by a U.S. patent application Ser. No. 155,117 filed on Feb. 11, 1988 (the disclosure of which is hereby incorporated by reference).

TABLE 1

|     |                    | Preferred Embodiment    | Conventional           |
|-----|--------------------|-------------------------|------------------------|
| (1) | Friction coefficient | 0.15                  | 0.30                   |
| (2) | Friction durability | 2500 number of times  | 900 number of times    |
| (3) | Water tightness    | 120 seconds or longer   | 120 seconds or longer  |
| (4) | Air tightness      | 300 seconds             | 300 seconds            |

As appreciated from the above-described test results, it was indicated that when the coating composition for treating the surface of the high molecular elastic material was, e.g., used for coating the surface of the weatherstrip for the automotive vehicle, the bleed out of the silicone oil could be prevented by means of grains of the polyethylene powder, the friction coefficient of the coated film surface was suppressed to become low and the lubricating ability and the abrasion resistance characteristic were increased and abrasion durability could remarkably be improved.

As described hereinabove, since according to the present invention the coating composition for treating the surface of the high molecular elastic material in which the silicone oil, fluorocarbon resin powder, and polyethylene powder are mixed and blended into the urethane coating material is used for a coating film of the surface of the coated material, the friction coefficient of the coated film can be suppressed, the lubricating ability can remarkably be improved, and the abrasion resistance characteristic and durability can remarkably be improved.

What is claimed is:

1. A coating composition for treating a surface of a high molecular elastic material, comprising:
   (a) a urethane coating material;
   (b) a silicone oil;
   (c) a fluorocarbon resin powder; and
   (d) a polyethylene powder, wherein the silicone oil, fluorocarbon resin powder, and polyethylene powder are mixed and blended with the urethane coating material to form a surface treating material.

2. A coating composition as set forth in claim 1, wherein the urethane coating material is 100 parts of weight, the silicone oil is 60 parts of weight, the fluorocarbon resin powder is 50 parts of weight, and polyethylene powder is 10 parts of weight.

3. A coating composition as set forth in claim 1, wherein the high molecular elastic material is used as a weatherstrip member in an automotive vehicle.

4. A coating composition for treating a surface of a weatherstrip member applicable to an automotive vehicle, comprising:
   (a) a urethane coating material;
   (b) a silicone oil;
   (c) a fluorocarbon resin powder; and
   (d) a polyethylene powder, wherein the silicone oil, fluorocarbon resin powder, and polyethylene powder are mixed and blended with the urethane coating material.

* * * * *